(12) United States Patent
Gabor et al.

(10) Patent No.: US 8,880,317 B2
(45) Date of Patent: Nov. 4, 2014

(54) REDUCED ENERGY VACUUM PUMP CONTROL

(71) Applicant: Ford Global Technologies, LLC, Dearborn, MI (US)

(72) Inventors: Daniel A. Gabor, Canton, MI (US); Ryan Skaff, Farmington Hills, MI (US)

(73) Assignee: Ford Global Technolies, LLC, Dearborn, MI (US)

( * ) Notice: Subject to any disclaimer, the term of this patent is extended or adjusted under 35 U.S.C. 154(b) by 0 days.

(21) Appl. No.: 13/728,447

(22) Filed: Dec. 27, 2012

(65) Prior Publication Data

US 2013/0131946 A1    May 23, 2013

Related U.S. Application Data

(62) Division of application No. 12/263,388, filed on Oct. 31, 2008, now Pat. No. 8,370,041.

(51) Int. Cl.
*B60T 8/44* (2006.01)
*B60T 13/46* (2006.01)
*B60T 17/02* (2006.01)

(52) U.S. Cl.
CPC *B60T 13/46* (2013.01); *B60T 17/02* (2013.01)
USPC .................... 701/78; 701/83; 701/70; 701/79; 303/115.4

(58) Field of Classification Search
USPC ..................... 701/78, 83, 70, 79; 303/115.4
See application file for complete search history.

(56) References Cited

U.S. PATENT DOCUMENTS

| 4,880,282 | A | * | 11/1989 | Makino et al. | 303/116.2 |
| 5,302,008 | A | * | 4/1994 | Miyake et al. | 303/14 |
| 5,373,454 | A | * | 12/1994 | Kanda et al. | 700/282 |
| 5,658,131 | A | * | 8/1997 | Aoki et al. | 417/44.2 |
| 5,797,663 | A | * | 8/1998 | Kawaguchi et al. | 303/146 |
| 6,135,577 | A | * | 10/2000 | Ishii | 303/114.1 |
| 6,322,164 | B1 | * | 11/2001 | Sakamoto et al. | 303/115.4 |
| 6,367,890 | B1 | * | 4/2002 | Hachtel | 303/115.4 |
| 7,167,783 | B2 | * | 1/2007 | Park et al. | 701/22 |
| 2004/0189083 | A1 | * | 9/2004 | Nowak et al. | 303/15 |
| 2006/0158028 | A1 | * | 7/2006 | Ichikawa | 303/114.3 |

* cited by examiner

*Primary Examiner* — Kevin Hurley
*Assistant Examiner* — Michael Stabley
(74) *Attorney, Agent, or Firm* — David Kelley, Esq.; Tung & Associates

(57) ABSTRACT

A method is provided that includes determining a state of a vehicle ignition switch; determining a state of the vehicle, wherein the vehicle state including at least one of whether the vehicle is in a torque producing mode, whether the vehicle is moving, and whether the vehicle brake system is engaged; and, controlling the vacuum pump in response to the vehicle state and the ignition switch state.

10 Claims, 2 Drawing Sheets

REDUCED ENERGY VACUUM PUMP CONTROL

FIELD OF THE INVENTION

This invention generally relates to methods for controlling a hydraulic brake system vacuum pump in a vehicle, and more particularly provides an improved method for controlling a hydraulic brake system vacuum pump in a vehicle including increased energy utilization efficiency in operating the vacuum pump.

BACKGROUND OF THE INVENTION

Power brake systems for vehicles[d1], for example, including hybrid electric vehicles (HEV's), typically include a hydraulic brake boosting system which increases the hydraulic force applied to the brakes when engaging a vehicle brake system (e.g., depressing a brake pedal).

A hydraulic brake system typically includes a vacuum pump which may be operated by a motor connected to the vehicle power system so as to generate negative pressure (vacuum) on a working fluid (e.g., air) which is stored in a brake booster, e.g., attached to the master cylinder Typically, when the brake pedal is engaged (e.g., depressed), negative pressure is introduced into the hydraulic brake system to increase (boost) the force applied to the brake system (e.g., master cylinder) in order to operate the brakes.

In order to assure that there is enough accumulated pressure to operate the brake system, various strategies in the prior art have been proposed for operating the vacuum pump.

Ishi (U.S. Pat. No. 6,135,577) discloses a "pump operation control apparatus for hydraulic brake boosting system" that determines whether an ignition switch has been switched on and a first timer measures the time in response to an ON signal of the ignition switch. When the time measured by the first time is longer that a predetermined time interval, the pump is operated.

Ichikawa (USPUB 2006/158028) discloses a "control system for brake vacuum pump" where a control unit determines when a vehicle has a speed equal to or greater than a preset creep speed after the startup of the engine, at which time the control unit allows operation of the vacuum pump.

Wada et al. (JP2020465) discloses a "control device for vacuum pump motor for vehicle" to reduce noise generation and power consumption by turning on a vacuum pump motor power source when an engine is started.

Tanihata (JP80983118) discloses "control method of hybrid electric vehicle" where operation of the brake booster vacuum pump and the power steering pump is prohibited until the engine that drives them is started and where the revolution rate of the engine is sensed to determine whether the engine is started.

Further methods are desirable for controlling the operation of a vacuum pump included in a hydraulic brake system (brake booster vacuum pump) in order to reduce power consumption and reduce pump operating noise, thereby improving brake booster vacuum pump operation.

Thus, there is a need for improved methods to control the operation of a vacuum pump included in a hydraulic brake system (brake booster vacuum pump) in order to improve operating efficiency of the brake system including reduced power consumption and reduced pump operating noise.

Therefore it is an object of the invention to provide an improved method to control the operation of a vacuum pump included in a hydraulic brake system (brake booster vacuum pump) in order to improve operating efficiency of the brake system including reduced power consumption and reduced pump operating noise.

SUMMARY OF THE INVENTION

In an exemplary embodiment, a method is provided that includes determining a state of a vehicle ignition switch; determining a state of the vehicle, said vehicle state including at least one of whether the vehicle is in a torque producing mode, whether the vehicle is moving, and whether the vehicle brake system is engaged; and, controlling the vacuum pump in response to the vehicle state and the ignition switch state.

These and other objects, aspects and features of the invention will be better understood from a detailed description of the preferred embodiments of the invention which are further described below in conjunction with the accompanying Figures.

DETAILED DESCRIPTION OF THE PREFERRED EMBODIMENT

The present invention achieves the foregoing objects, aspects and features by providing an improved method to control the operation of a brake booster vacuum pump in order to improve operating efficiency of the brake system including reduced power consumption and reduced pump operating noise.

It will be appreciated that method of the present invention may be implemented with respect to a vehicle having a fuel driven motor, including a combustion engine, an electric driven motor, or a hybrid of the foregoing, such as a Hybrid Electric Vehicle (HEV).

Figure 1:
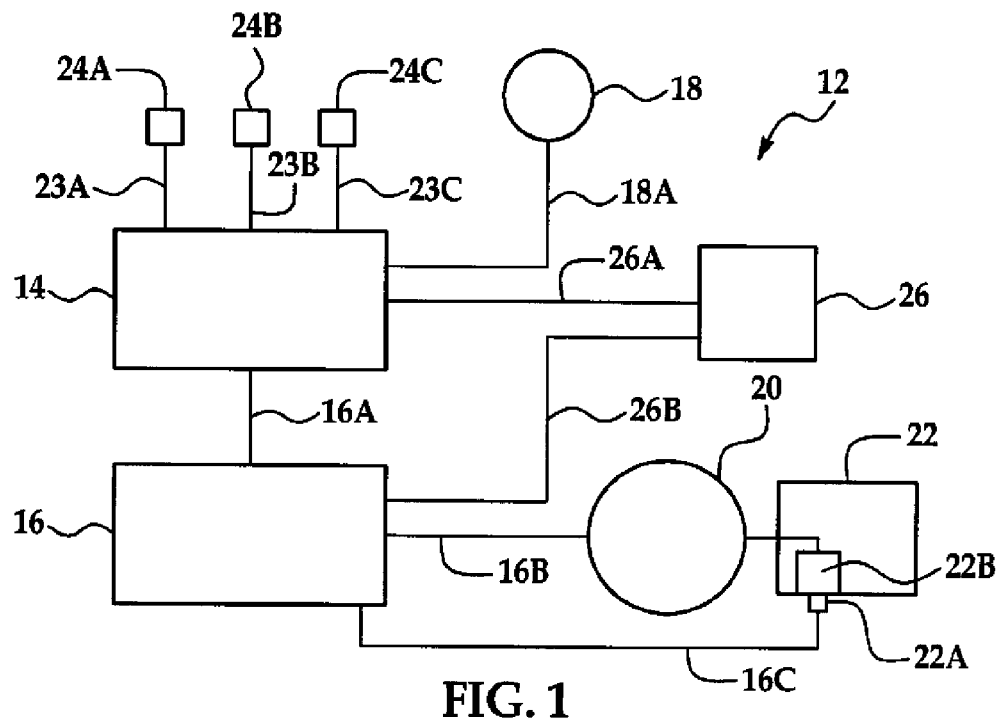
FIG. 1 is a schematic diagram of a brake booster vacuum pump control system according including several exemplary embodiments of the present invention.

In one exemplary embodiment, referring to FIG. 1, the vehicle includes a brake booster vacuum pump control system 12 including a vehicle control system (VCS) 14, which may be a conventional controller including memory for storing and executing pre-programmed instructions (computer programs) as well as electrical signal input/output to receive electrical signals from sensors or other control units and output signals and/or instructions to vehicle components or other control units.

The vehicle control system (VCS) 14 is at least in signal communication (e.g., two-way) with a Brake System Control Module (BSCM) 16 e.g., by wiring 16A, and in signal communication with an ignition sensor 18, e.g., by wiring 18A, where the ignition sensor may be a conventional sensor having the ability to detect a position/state of the ignition switch including an engine/motor on or off position/state. It will be appreciated that signal communication within the brake booster vacuum pump control system 12 and between components thereof may be wired, wireless, or a combination thereof.

The Brake System Control Module (BSCM) 16 is in signal communication, e.g., wiring 16B with a conventional vacuum pump 20, such as a vacuum pump with an electrically driven motor. The vacuum pump 20 is preferably in communication with a conventional hydraulically driven brake system 22 including a master cylinder which may include a conventional brake booster e.g., 22B in communication with a master cylinder and one or more pressure sensors e.g., 22A in communication with the BSCM 16, e.g., by wiring 16C. The pressure sensors e.g., 22A sense a pressure level of available useable pressurized air (vacuum) for use in conventional operation to provide boosted force applied to the hydraulically driven brake system 22 when the brake system is applied (e.g., by depressing a brake pedal). For example, the BSCM 16 may be programmed to operate the vacuum pump under several conditions according to exemplary embodiments including until the vacuum pressure within a pressure storage system, e.g., brake booster 22B, is equal to or greater than a predetermined value or is within a predetermined pressure range.

In an exemplary embodiment, the vacuum pump is placed in operation upon determining that the vehicle is in a torque producing mode of operation. For example, the vacuum pump may be placed in operation (turned on) to operate in accordance with predetermined sensed vacuum pressure levels e.g., pressure sensor 22A.

For example, in a power up mode of operation, the VCS 14 determines whether the vehicle is in a torque producing mode of operation and outputs a signal to the BSCM 16 which in turn outputs a signal to the vacuum pump 20 to turn on (operate) the vacuum pump. It will be appreciated that by the term torque producing mode, is meant a mode of operation enabling the vehicle to produce torque external to a torque producing unit (e.g. combustion engine, electric motor), including either positive or negative torque (e.g., drive train engaged and/or brake regenerative system engaged).

In an exemplary embodiment, the determination of whether the vehicle is in a torque producing mode may be made by determining one or more factors including an initial determination of whether the vehicle motor/engine is on (ignition switch is on; e.g., run or run/start position) in combination with a determination of whether a torque producing unit of the vehicle is in a configuration to produce either positive or negative torque (e.g., drive train engaged).

For example, the vacuum pump control system 12 (VSC 14 and/or BSCM 16) may be in communication with one or more sensors such as motion sensors e.g., 24A, e.g., including one or more wheel motion sensors in communication (e.g., wiring 23A) with the VSC 14 and/or BSCM 16 to determine whether the vehicle is in motion and/or a drive train engagement sensor 24B in communication (e.g., wiring 23B) with the VSC 16 to determine whether the vehicle drive train is engaged. The VSC 14 and/or BSCM 16 then outputs a signal to the vacuum pump 20 to enable operation the vacuum pump depending on a state of stored vacuum pressure (e.g., stored in brake booster 22B which may be connected to a master cylinder comprising brake system 22). It will be appreciated that sensors e.g., 24A, 24B, and 24C may be in communication with either controller VCS 14 and/or BSCM 16.

Figure 2:
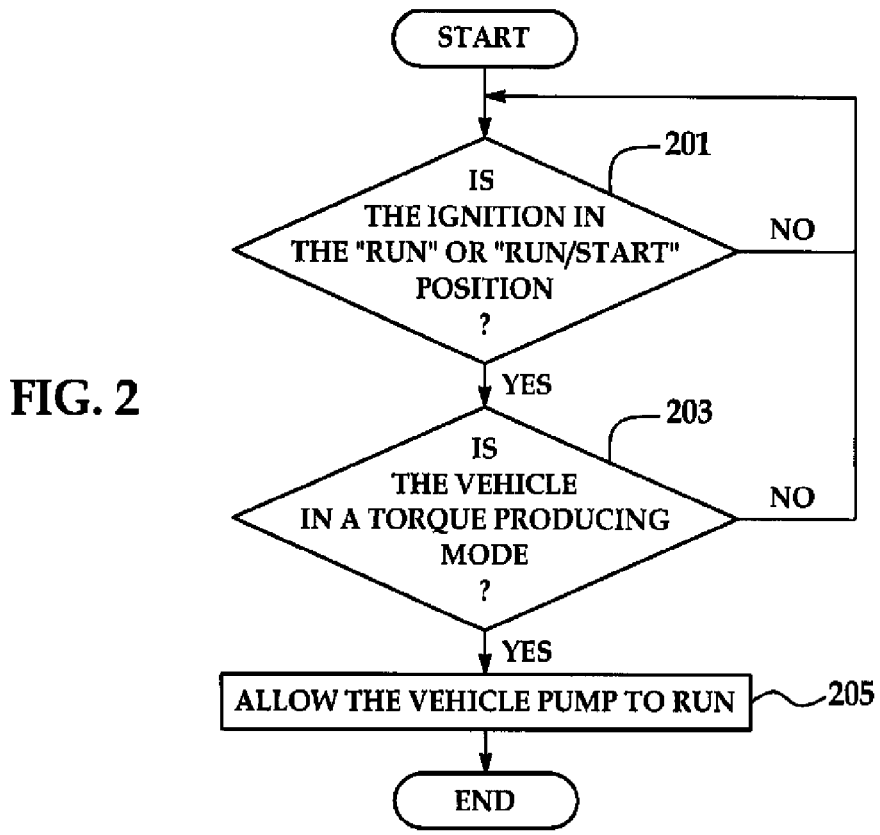
FIG. 2 is a flow diagram of an exemplary embodiment according to the present invention.

For example, referring to FIG. 2 is shown logic implementation of preprogrammed instructions (e.g., executed by VSC 14 in communication with BSCM 16) which enables operation a vacuum pump e.g., 20 according to exemplary embodiments. In step 201 it is determined whether the ignition switch is in an on position (e.g., a run and/or start position). If the ignition switch is in a run and/or start position, in step 203 it is then determined whether the vehicle is in a torque producing mode e.g., whether the drive train and or brakes are engaged to produce torque. In step 205, if the vehicle is in a torque producing mode, then the vacuum pump is enabled to run, e.g., the vacuum pump is turned on and operated in accordance with pressure set points (e.g., operated to reach a predetermined vacuum pressure threshold in the brake system (e.g., brake booster 22B) or maintained within a predetermined vacuum pressure range).

Figure 3:
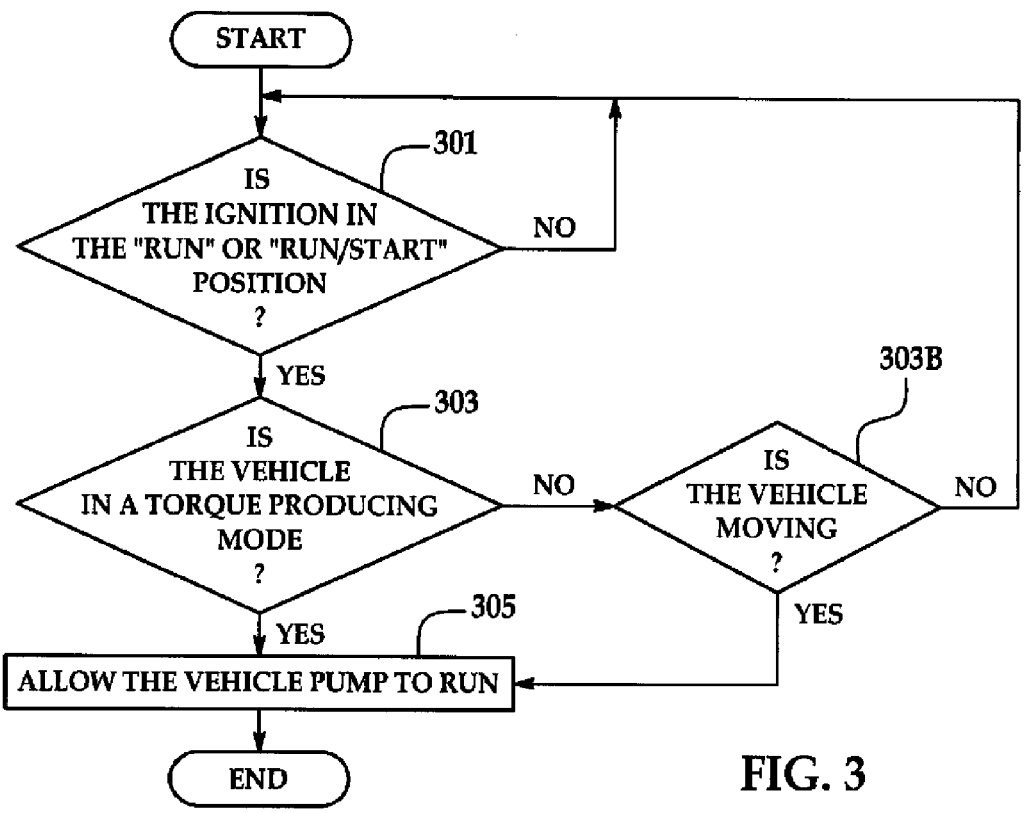
FIG. 3 is a flow diagram of an exemplary embodiment according to the present invention.

In another exemplary embodiment, the method may include the additional determination of whether the vehicle is moving in addition to the determination of whether the vehicle is in a torque producing mode. For example, referring to FIG. 3 is shown logic implementation of preprogrammed instructions which operate the vacuum pump according to exemplary embodiments. The steps 301-305 are similar to steps 201-205. In Step 303B, however, even if the vehicle is not in a torque producing mode, it is determined whether the vehicle is moving to then enable operation of the vacuum pump in step 305. That is, even if it is determined that the vehicle is not in a torque producing mode, but is moving, operation of the vacuum pump is enabled in step 305 to ensure that the brake system is operational as if the vehicle were in the torque producing mode, thereby providing enhanced safety (e.g., brakes fully operational even with loss of torque produced by motor).

Figure 4:
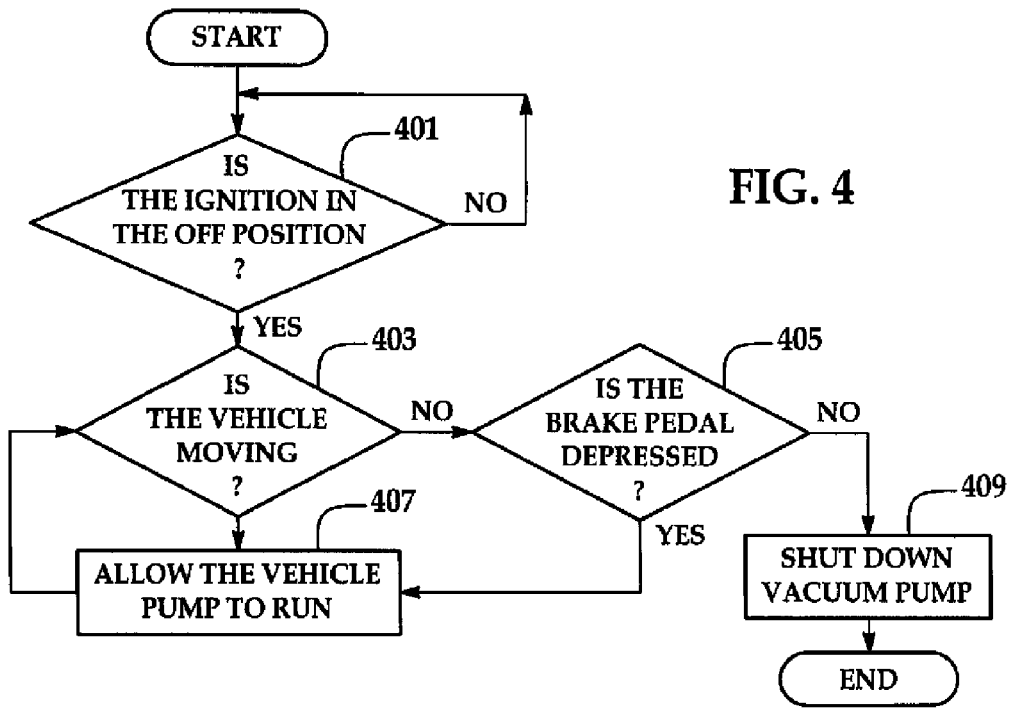
FIG. 4 is a flow diagram of an exemplary embodiment according to the present invention.

In another exemplary embodiment, referring to FIG. 4, in a power down operation of a vehicle, for example, where there the ignition switch is sensed to be in a stop/off position/state (step 401) and/or there is a loss of a signal to the VCS 14 indicating ignition is on, the vacuum pump control system e.g., System 12 including the VCS 14, the BSCM 16, and the vacuum pump 20, will be operated with continued backup power from the vehicle power sources (power latch) and maintain enabled operation of the vacuum pump (step 407) if it is determined that the vehicle is moving (step 403) and/or if it is determined that the brake system 22 is being engaged (e.g. brake pedal depressed by the driver) (step 405) as determined e.g., by brake depression sensor 24C in communication (e.g., wiring 23C) with VCS 14. If neither of the foregoing conditions is present, the vacuum pump control system 12 may shut down (step 409).

For example, referring to FIG. 1, the vacuum pump control system 12 may include a power sustain relay 26 e.g., in communication with VCS 14 (e.g., wiring 26A) and BSCM 16 (e.g., wiring 26B) which operates to maintain backup power to components of the vacuum pump control system 12 to maintain enabled operation of the vacuum pump 20, e.g., in the case of the vehicle ignition in an off position or ignition on signal is lost while the brake system being engaged and/or the vehicle is moving.

It will also be appreciated that one or more calibrated time delays may be incorporated into the operation of vacuum pump control system 12. For example, in power up operation, a time delay may be preprogrammed to ensure operation of the vehicle power producing unit (e.g., engine or motor) prior to enabling operation of the vacuum pump, thereby increasing efficiency of energy usage as well as reducing undesirable or unnecessary pump noise attributable to pump operation. In addition, it will be appreciated that even though the vacuum pump 20 is enabled, the VCS 14 and/or the BSCM 16 may be programmed to not actually operate the pump if the vacuum pressure available (e.g., stored in brake booster) necessary to operate the brake system is equal to or greater than a predetermined vacuum pressure threshold or within a predetermined operational vacuum threshold range, thereby increasing efficiency of energy usage as well as reducing undesirable or unnecessary pump noise.

While the embodiments illustrated in the Figures and described above are presently preferred, it should be understood that these embodiments are offered by way of example only. The invention is not limited to a particular embodiment, but extends to various modifications, combinations, and permutations as will occur to the ordinarily skilled artisan that nevertheless fall within the scope of the appended claims.

What is claimed is:

1. A system for controlling a vehicle brake system vacuum pump comprising:
    a vehicle ignition switch comprising an on state and an off state;
    at least one controller and a plurality of sensors in communication with said at least one controller, said at least one controller configured to determine a state of the vehicle, said vehicle state comprising at least one of whether the vehicle is in a torque producing mode, whether the vehicle is moving, whether the vehicle brake system is engaged, and whether the ignition switch is in an on state or an off state or whether a signal from said ignition switch is absent;
    a vacuum pump in communication with said at least one controller;
    wherein said at least one controller is configured to enable the vacuum pump to operate in response to a combination of the determined the vehicle state and the ignition switch state; and,
    wherein said at least one controller is configured to enable the vacuum pump operate in the case that the ignition switch is in an on state and the state of said vehicle comprises at least one of; said vehicle is in a torque producing mode and said vehicle is moving.

2. The system of claim 1, wherein said at least one controller is configured to enable the vacuum pump to operate in the case that the ignition switch is in an off state or a signal from said ignition switch is absent and the state of said vehicle comprises at least one of; said vehicle is moving and said vehicle brake system is engaged.

3. The system of claim 1, wherein said at least one controller is configured to disable operation of the vacuum pump in the case that the ignition switch is in an off state or a signal from the ignition switch is absent and the state of said vehicle comprises both of; said vehicle is not moving and said vehicle brake system is not engaged.

4. The system of claim 1, wherein said at least one controller and a plurality of sensors comprises a vehicle motion sensor, said vehicle motion sensor configured to sense motion of wheels comprising said vehicle.

5. The system of claim 1, wherein said at least one controller and a plurality of sensors comprises a torque producing mode sensor, said torque producing mode sensor configured to sense engagement of a torque producing unit comprising said vehicle with a drive train comprising said vehicle.

6. The system of claim 1, wherein said at least one controller is configured to enable the vacuum pump to maintain a vacuum pressure available to be applied to said brake system upon said engagement of said brake system, said pressure above a threshold pressure and/or within an operating pressure range.

7. The system of claim 1, wherein said vehicle is a hybrid electric vehicle.

8. A system for of controlling a vehicle brake system vacuum pump comprising:
    a vehicle ignition switch comprising an on state and an off state;
    at least one controller and a plurality of sensors in communication with said at least one controller, said at least one controller configured to determine in response to respective sensor signals a state of the vehicle, said vehicle state comprising at least one of whether the vehicle is in a torque producing mode, whether the vehicle is moving, whether the vehicle brake system is engaged, and whether the ignition switch is in an on state or an off state or whether a signal from said ignition switch is absent;
    a vacuum pump in communication with said at least one controller;
    wherein said at least one controller is configured to enable the vacuum pump to operate by turning the vacuum pump on in the case the controller determines that the ignition switch is in an off state or a signal from said ignition switch is absent and the state of said vehicle comprises at least one of; said vehicle is moving and said vehicle brake system is engaged.

9. A system for of controlling a vehicle brake system vacuum pump comprising:
    a vehicle ignition switch comprising an on state and an off state;
    at least one controller and a plurality of sensors in communication with said at least one controller, said at least one controller configured to determine a state of the vehicle, said vehicle state comprising at least one of whether the vehicle is in a torque producing mode, whether the vehicle is moving, whether the vehicle brake system is engaged, and whether the ignition switch is in an on state or an off state or whether a signal from said ignition switch is absent;
    a vacuum pump in communication with said at least one controller;
    wherein said at least one controller is configured to enable the vacuum pump to operate in the case that the ignition switch is in an off state or a signal from said ignition switch is absent and the state of said vehicle comprises at least one of; said vehicle is moving and said vehicle brake system is engaged; and,
    wherein said at least one controller is configured to disable operation of the vacuum pump in the case that the ignition switch is in an off state or a signal from the ignition switch is absent and the state of said vehicle comprises both of; said vehicle is not moving and said vehicle brake system is not engaged.

10. A system for of controlling a vehicle brake system vacuum pump comprising:
    a vehicle ignition switch comprising an on state and an off state;
    at least one controller and a plurality of sensors in communication with said at least one controller, said at least one controller configured to determine a state of the vehicle, said vehicle state comprising at least one of whether the vehicle is in a torque producing mode, whether the vehicle is moving, whether the vehicle brake system is engaged, and whether the ignition switch is in an on state or an off state;
    a vacuum pump in communication with said at least one controller;
    wherein said at least one controller is configured to enable the vacuum pump to operate in the case that the ignition switch is in an on state and the state of said vehicle comprises at least one of; said vehicle is in a torque producing mode and said vehicle is moving.

* * * * *